(12) United States Patent
Yamakawa (10) Patent No.: US 11,973,452 B2
(45) Date of Patent: Apr. 30, 2024

(54) FAN MOTOR STOPPING APPARATUS

(71) Applicant: Mitsubishi Electric Corporation, Tokyo (JP)

(72) Inventor: Hidetoshi Yamakawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 249 days.

(21) Appl. No.: 17/613,185

(22) PCT Filed: Oct. 10, 2019

(86) PCT No.: PCT/JP2019/040084
§ 371 (c)(1),
(2) Date: Nov. 22, 2021

(87) PCT Pub. No.: WO2021/070341
PCT Pub. Date: Apr. 15, 2021

(65) Prior Publication Data
US 2022/0239239 A1 Jul. 28, 2022

(51) Int. Cl.
*H02P 3/08* (2006.01)
*F24F 11/37* (2018.01)
*F24F 11/88* (2018.01)

(52) U.S. Cl.
CPC ............... *H02P 3/08* (2013.01); *F24F 11/37* (2018.01); *F24F 11/88* (2018.01)

(58) Field of Classification Search
CPC .... H02P 3/08; F24F 11/37; F24F 11/88; F24F 11/08
See application file for complete search history.

(56) References Cited

U.S. PATENT DOCUMENTS

| 3,742,302 A | * | 6/1973 | Neill | ......................... H02H 7/08 |
| | | | | 361/93.6 |
| 3,777,240 A | * | 12/1973 | Neill | ....................... H02H 7/224 |
| | | | | 361/22 |

(Continued)

FOREIGN PATENT DOCUMENTS

| JP | H06-030597 A | 2/1994 |
| JP | 2012-110183 A | 6/2012 |

(Continued)

OTHER PUBLICATIONS

Office Action dated Nov. 19, 2022 issued in corresponding Australian Patent Application No. 2019469894.

(Continued)

*Primary Examiner* — Thai T Dinh
(74) *Attorney, Agent, or Firm* — POSZ LAW GROUP, PLC (57) ABSTRACT

A fan motor stopping apparatus includes a conversion circuit that converts alternating-current voltage supplied from an alternating-current power supply into direct-current voltage, a smoothing capacitor that is connected to a fan motor included in an air conditioner and smooths the direct-current voltage from the conversion circuit, a voltage detection circuit that detects a voltage across the smoothing capacitor, and a fan motor shutdown circuit that suspends the fan motor in operation when the voltage detection circuit detects a voltage less than or equal to a threshold that is preset for suspending the operation of the fan motor.

2 Claims, 7 Drawing Sheets

(56) References Cited

U.S. PATENT DOCUMENTS

| | | | | |
|---|---|---|---|---|
| 8,988,836 B2* | 3/2015 | Saruwatari | .............. | F24F 11/00 |
| | | | | 318/434 |
| 2012/0033334 A1* | 2/2012 | Saruwatari | .............. | H02P 29/02 |
| | | | | 361/22 |

FOREIGN PATENT DOCUMENTS

| | | | | | |
|---|---|---|---|---|---|
| JP | 2012110183 | A | * | 6/2012 | |
| JP | 2013-059257 | A | | 3/2013 | |
| JP | 2013-242081 | A | | 12/2013 | |
| JP | 2013242081 | A | * | 12/2013 | |
| WO | 2017/195370 | A1 | | 11/2017 | |
| WO | WO-2017195370 | A1 | * | 11/2017 | .............. H02M 7/06 |

OTHER PUBLICATIONS

Office Action dated Oct. 4, 2022 issued in corresponding JP patent application No. 2021-551054 (and English machine translation).
International Search Report dated Nov. 19, 2019, issued in corresponding International Application No. PCT/JP2019/040084 (and English Machine Translation).

* cited by examiner

FAN MOTOR STOPPING APPARATUS

CROSS REFERENCE TO RELATED APPLICATION

This application is a U.S. national stage application of International Patent Application No. PCT/JP2019/040084s filed on Oct. 10, 2019, the disclosure of which is incorporated herein by reference.

TECHNICAL FIELD

The present invention relates to a fan motor stopping apparatus that suspends operation of a fan motor included in an air conditioner.

BACKGROUND

When a power failure occurs, voltage of a smoothing capacitor is decreased by a load in an air conditioner. The voltage of the smoothing capacitor is used to configure a direct-current power supply that operates a microcomputer of the air conditioner. When the voltage of the smoothing capacitor decreases below a certain voltage, the microcomputer stops operating. A proposed conventional air conditioner (refer to, for example, Patent Literature 1) switches a path for charging a smoothing capacitor when voltage of the smoothing capacitor is less than or equal to a certain value, with a load not operating.

PATENT LITERATURE

Patent Literature 1: Japanese Patent Application Laid-open No. 2012-110183

With the conventional technique, however, the operation of the load is difficult to suspend when a power failure occurs, thus decreasing the voltage of the smoothing capacitor. Therefore, when power returns, overcurrent flows through a plurality of constituent elements of the air conditioner, problematically causing part or all of the plurality of constituent elements to fail.

SUMMARY

The present invention has been made in view of the above, and an object of the present invention is to obtain a fan motor stopping apparatus that prevents constituent element failures in an air conditioner when power returns after a power failure.

In order to solve the above problem and achieve the object, a fan motor stopping apparatus according to the present invention includes: a conversion circuit that converts alternating-current voltage supplied from an alternating-current power supply into direct-current voltage; a smoothing capacitor that smooths the direct-current voltage from the conversion circuit, the smoothing capacitor being connected to a fan motor included in an air conditioner; a voltage detection circuit that detects a voltage across the smoothing capacitor; and a fan motor shutdown circuit that suspends the fan motor in operation when the voltage detection circuit detects a voltage less than or equal to a threshold that is preset for suspending the operation of the fan motor. The fan motor stopping apparatus further includes an inrush current protection circuit including a function of preventing an inrush current from flowing into the conversion circuit, the inrush current protection circuit including a resistor connected to the alternating-current power supply and the conversion circuit and a relay in parallel with the resistor to switch between a state of connecting the alternating-current power supply and the conversion circuit and a state of disconnecting the alternating-current power supply and the conversion circuit. The fan motor stopping apparatus further includes: a relay control circuit that controls the relay of the inrush current protection circuit; and a determination circuit that determines whether or not alternating-current voltage is being supplied from the alternating-current power supply to the conversion circuit. The relay control circuit opens the relay after a first predetermined time period elapses since the determination circuit first determines suspension of the alternating-current voltage supply from the alternating-current power supply to the conversion circuit with the relay in a closed state. The threshold is higher than a voltage across the smoothing capacitor that allows an inrush current to cause failure of at least one constituent element of the fan motor stopping apparatus when power returns after a power failure. The first predetermined time period is a time period between a reference point of time when the determination circuit first determines the suspension of the alternating-current voltage supply and a point of time when the smoothing capacitor experiencing a decrease in voltage reaches a voltage level that causes electronic component failure when the power returns.

The fan motor stopping apparatus according to the present invention is capable of preventing constituent element failures in the air conditioner when power returns after a power failure.

DETAILED DESCRIPTION

With reference to the drawings, a detailed description is hereinafter provided of fan motor stopping apparatuses according to embodiments of the present invention. It is to be noted that these embodiments are not restrictive of the present invention.

First Embodiment

Figure 1:
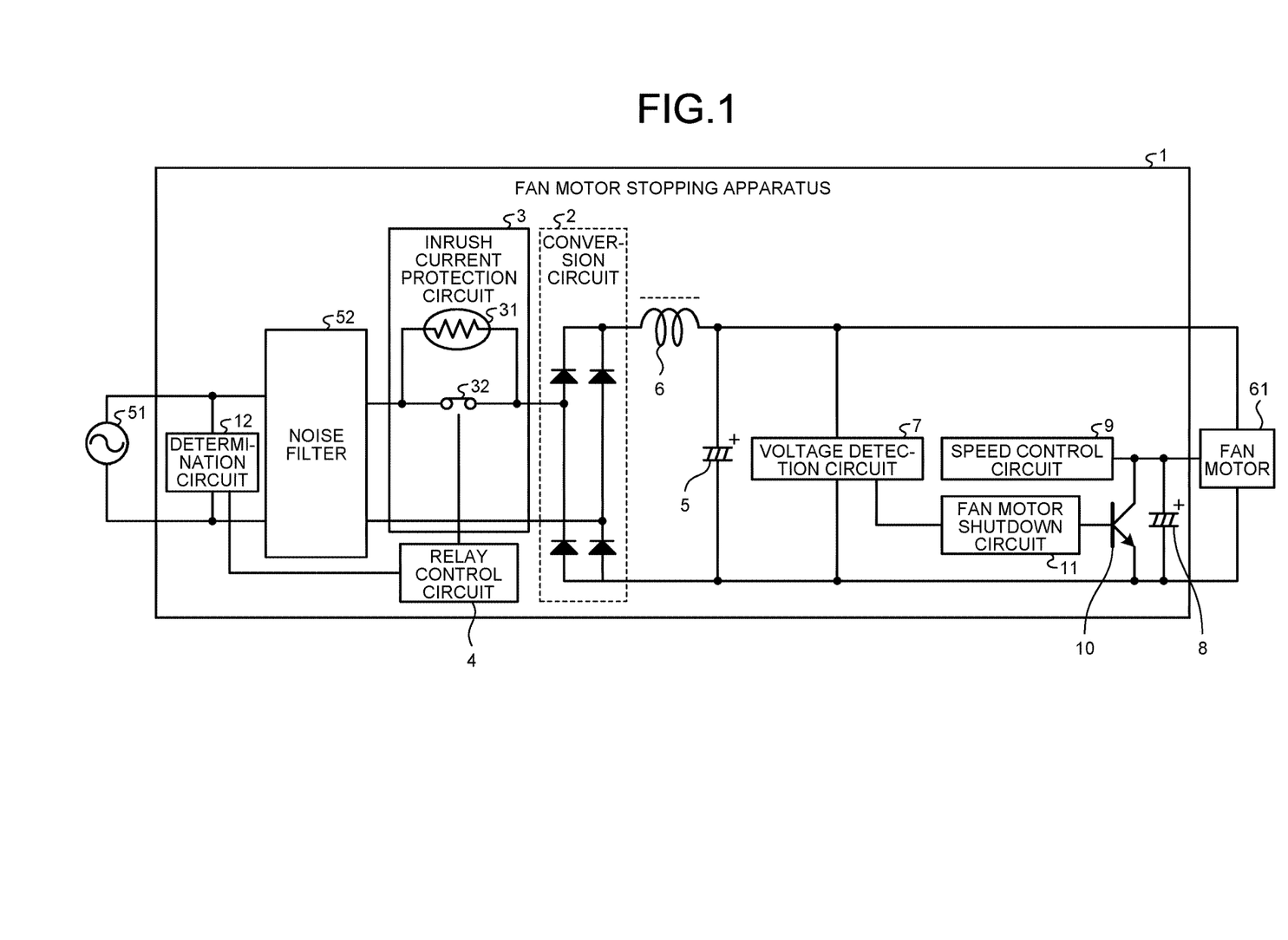
FIG. 1 illustrates a configuration of a fan motor stopping apparatus according to a first embodiment.

A description is provided first of a configuration of a fan motor stopping apparatus 1 according to the first embodiment. FIG. 1 illustrates the configuration of the fan motor stopping apparatus 1 according to the first embodiment. The fan motor stopping apparatus 1 is included in an air conditioner and includes a conversion circuit 2 that converts alternating-current voltage supplied from an alternating-current power supply 51 into direct-current voltage. FIG. 1 also illustrates the alternating-current power supply 51. The conversion circuit 2 is implemented, for example, by a diode bridge that includes a plurality of diodes. The fan motor stopping apparatus 1 further includes a noise filter 52 that is connected to the alternating-current power supply 51 and removes noise from the alternating-current voltage, which is supplied from the alternating-current power supply 51. The conversion circuit 2 converts the alternating-current voltage from the noise filter 52 into the direct-current voltage.

The fan motor stopping apparatus 1 further includes an inrush current protection circuit 3 that is closer to the alternating-current power supply 51 than the conversion circuit 2 is and includes a function of preventing inrush current from flowing into the conversion circuit 2. The inrush current protection circuit 3 includes a resistor 31 that is connected to the alternating-current power supply 51 and the conversion circuit 2 and a relay 32 that is in parallel with the resistor 31 and switches between a state of connecting the alternating-current power supply 51 and the conversion circuit 2 and a state of disconnecting the alternating-current power supply 51 and the conversion circuit 2. The resistor 31 is implemented, for example, by a positive temperature coefficient (PTC) thermistor that exhibits a relatively sharp increase in resistance as temperature rises above a certain temperature.

As described above, the fan motor stopping apparatus 1 according to the first embodiment has the noise filter 52 that removes the noise from the alternating-current voltage, which is supplied from the alternating-current power supply 51. Therefore, in the first embodiment, the resistor 31 and the relay 32 are connected to the noise filter 52 at their respective ends closer to the alternating-current power supply 51. Since the noise filter 52 is connected to the alternating-current power supply 51, the respective ends of the resistor 31 and the relay 32 that are closer to the alternating-current power supply 51 are connected to the alternating-current power supply 51 via the noise filter 52. The noise filter 52 does not have to be provided. In the case of no noise filter 52, the resistor 31 and the relay 32 are connected directly to the alternating-current power supply 51 at their respective ends closer to the alternating-current power supply 51.

The fan motor stopping apparatus 1 further includes a relay control circuit 4 that controls the relay 32 and a smoothing capacitor 5 that is connected to a fan motor 61 included in the air conditioner and smooths the direct-current voltage from the conversion circuit 2. FIG. 1 also illustrates the fan motor 61. A plurality of constituent elements of the air conditioner except the fan motor stopping apparatus 1 and the fan motor 61 are not illustrated in FIG. 1. The fan motor stopping apparatus 1 further includes a direct-current reactor 6 that prevents inflow of harmonic currents from the conversion circuit 2 into the smoothing capacitor 5, and a voltage detection circuit 7 that detects a voltage across the smoothing capacitor 5.

The fan motor stopping apparatus 1 further includes an electrolytic capacitor 8 for controlling rotational speed of the fan motor 61, a speed control circuit 9 that controls the rotational speed of the fan motor 61, and a transistor 10 that discharges the electrolytic capacitor 8. Specifically, the speed control circuit 9 causes the electrolytic capacitor 8 to store or release electric charge, thus applying a voltage to the fan motor 61 for rotating the fan motor 61 at a specified rotational speed. Accordingly, the fan motor 61 rotates at the specified rotational speed.

The fan motor stopping apparatus 1 further includes a fan motor shutdown circuit 11 that suspends the fan motor 61 in operation when the voltage detection circuit 7 detects a voltage less than or equal to a threshold that is preset for suspending the operation of the fan motor 61. The fan motor shutdown circuit 11 includes two ends. A first one of the two ends is connected to the voltage detection circuit 7, and a second one of the two ends is connected to the transistor 10.

The fan motor stopping apparatus 1 further includes a determination circuit 12 that determines whether or not the alternating-current voltage is being supplied from the alternating-current power supply 51 to the conversion circuit 2. After a first predetermined time period elapses since the determination circuit 12 first determines suspension of the supply of the alternating-current voltage from the alternating-current power supply 51 to the conversion circuit 2 with the relay 32 of the inrush current protection circuit 3 in a closed state, the relay control circuit 4 opens the relay 32. In other words, the relay control circuit 4 opens the relay 32 after the first predetermined time period elapses since the determination circuit 12 first determines a power failure with the relay 32 in the closed state.

After a second predetermined time period elapses since the determination circuit 12 first determines the supply of the alternating-current voltage from the alternating-current power supply 51 to the conversion circuit 2 with the relay 32 in an open state, the relay control circuit 4 closes the relay 32. In other words, the relay control circuit 4 closes the relay 32 after the second time period elapses since power returns with the relay 32 in the open state.

Figure 2:
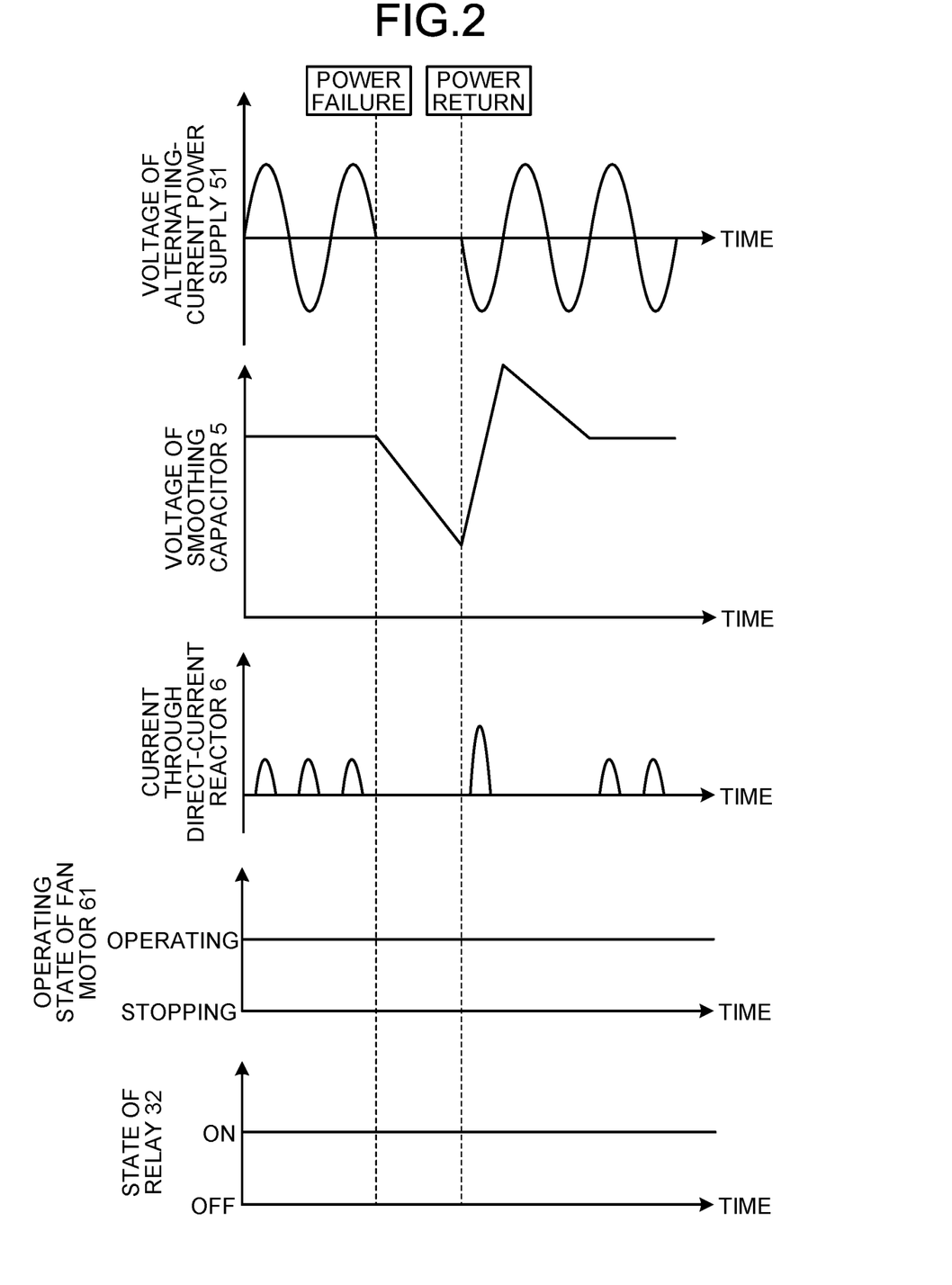
FIG. 2 illustrates waveforms relevant to the fan motor stopping apparatus according to the first embodiment when a fan motor shutdown circuit of the fan motor stopping apparatus does not operate.

A description is provided next of operation of the fan motor stopping apparatus 1 according to the first embodiment. FIG. 2 illustrates waveforms relevant to the fan motor stopping apparatus 1 according to the first embodiment when the fan motor shutdown circuit 11 of the fan motor stopping apparatus 1 does not operate. Specifically, FIG. 2 illustrates in the form of the waveforms how the voltage of the alternating-current power supply 51, the voltage of the smoothing capacitor 5, current through the direct-current reactor 6, an operating state of the fan motor 61, and the state of the relay 32 change with time when the fan motor shutdown circuit 11 does not operate. In FIG. 2, "ON" indicates that the relay 32 is closed, and "OFF" indicates that the relay 32 is open.

As illustrated in FIG. 2, the relay 32 is closed when the fan motor 61 is in operation with an outdoor unit of the air conditioner running. In this case, the alternating-current power supply 51 and the conversion circuit 2 are connected in a conductive state. When a power failure occurs in this state, suspending the supply of the power from the alternating-current power supply 51 to the conversion circuit 2, the voltage of the smoothing capacitor 5 decreases.

When the power returns in this state, resuming the power supply from the alternating-current power supply 51 to the conversion circuit 2, an inrush current flows into the conversion circuit 2 because the relay 32 is closed. Therefore, there is a possibility that among the constituent elements of the fan motor stopping apparatus 1, the conversion circuit 2 and part or all of those between the conversion circuit 2 and the fan motor 61 will fail when the power returns. When note is taken of the smoothing capacitor 5, the inrush current flows into the direct-current reactor 6, and the smoothing capacitor 5 is thereafter charged with energy stored in the direct-current reactor 6. Accordingly, the voltage of the smoothing capacitor 5 increases and may exceed a withstand voltage of the smoothing capacitor 5 and cause the failure of the smoothing capacitor 5.

Figure 3:
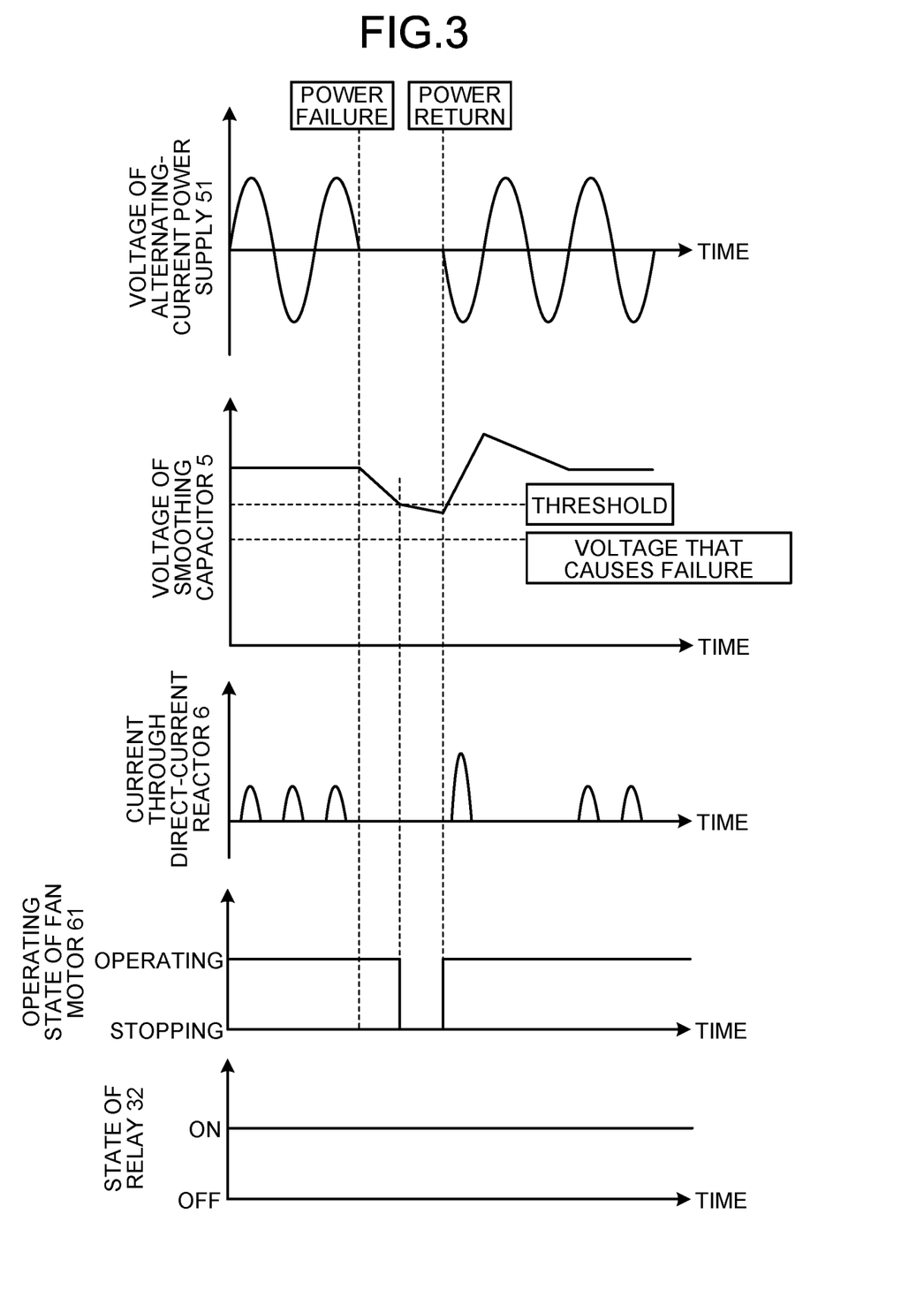
FIG. 3 illustrates waveforms relevant to the fan motor stopping apparatus according to the first embodiment when the fan motor shutdown circuit of the fan motor stopping apparatus operates.

FIG. 3 illustrates waveforms relevant to the fan motor stopping apparatus 1 according to the first embodiment when the fan motor shutdown circuit 11 of the fan motor stopping apparatus 1 operates. Specifically, FIG. 3 illustrates in the form of the waveforms how the voltage of the alternating-current power supply 51, the voltage of the smoothing capacitor 5, the current through the direct-current reactor 6, the operating state of the fan motor 61, and the state of the relay 32 change with time when the fan motor shutdown circuit 11 operates. In FIG. 3, "ON" indicates that the relay 32 is closed, and "OFF" indicates that the relay 32 is open.

As in the description based on FIG. 2, the relay 32 is closed while the fan motor 61 is in operation with the outdoor unit of the air conditioner running even when the fan motor shutdown circuit 11 operates. Here the alternating-current power supply 51 and the conversion circuit 2 are connected in the conductive state. When a power failure occurs in this state, suspending the power supply from the alternating-current power supply 51 to the conversion circuit 2, the power to the smoothing capacitor 5 is cut off, and the voltage of the smoothing capacitor 5 decreases.

The fan motor shutdown circuit 11 suspends the fan motor 61 in operation when a voltage detected by the voltage detection circuit 7 is less than or equal to the threshold that is preset for suspending the operation of the fan motor 61, that is to say, when the voltage detection circuit 7 detects the voltage of the smoothing capacitor 5 that is less than or equal to the threshold. In a specific example of the first embodiment, when the voltage detected by the voltage detection circuit 7 is less than or equal to the threshold, the fan motor shutdown circuit 11 drives the transistor 10 to cause the electrolytic capacitor 8 to release stored electric charge, thus suspending the operation of the fan motor 61.

The fan motor 61 consumes relatively great power. When the power supply from the alternating-current power supply 51 to the conversion circuit 2 is suspended due to the power failure, the fan motor 61 discharges the smoothing capacitor 5. With the suspension of the operation of the fan motor 61, the discharge of the smoothing capacitor 5 is reduced. Therefore, when the power supply from the alternating-current power supply 51 to the conversion circuit 2 resumes due to the power return with the operation of the fan motor 61 being suspended, among the constituent elements of the fan motor stopping apparatus 1, the conversion circuit 2 and the part or all of those between the conversion circuit 2 and the fan motor 61 can be prevented from failing.

This means that the fan motor shutdown circuit 11 is capable of preventing the constituent element(s) of the air conditioner from failing when the power returns by suspending the operation of the fan motor 61 when the voltage detection circuit 7 detects the voltage of the smoothing capacitor 5 that is less than or equal to the threshold. As illustrated in FIG. 3, the threshold is higher than a voltage across the smoothing capacitor 5 that allows the inrush current to cause the failure of at least one of the constituent elements of the fan motor stopping apparatus 1 when the power returns after the power failure.

Figure 4:
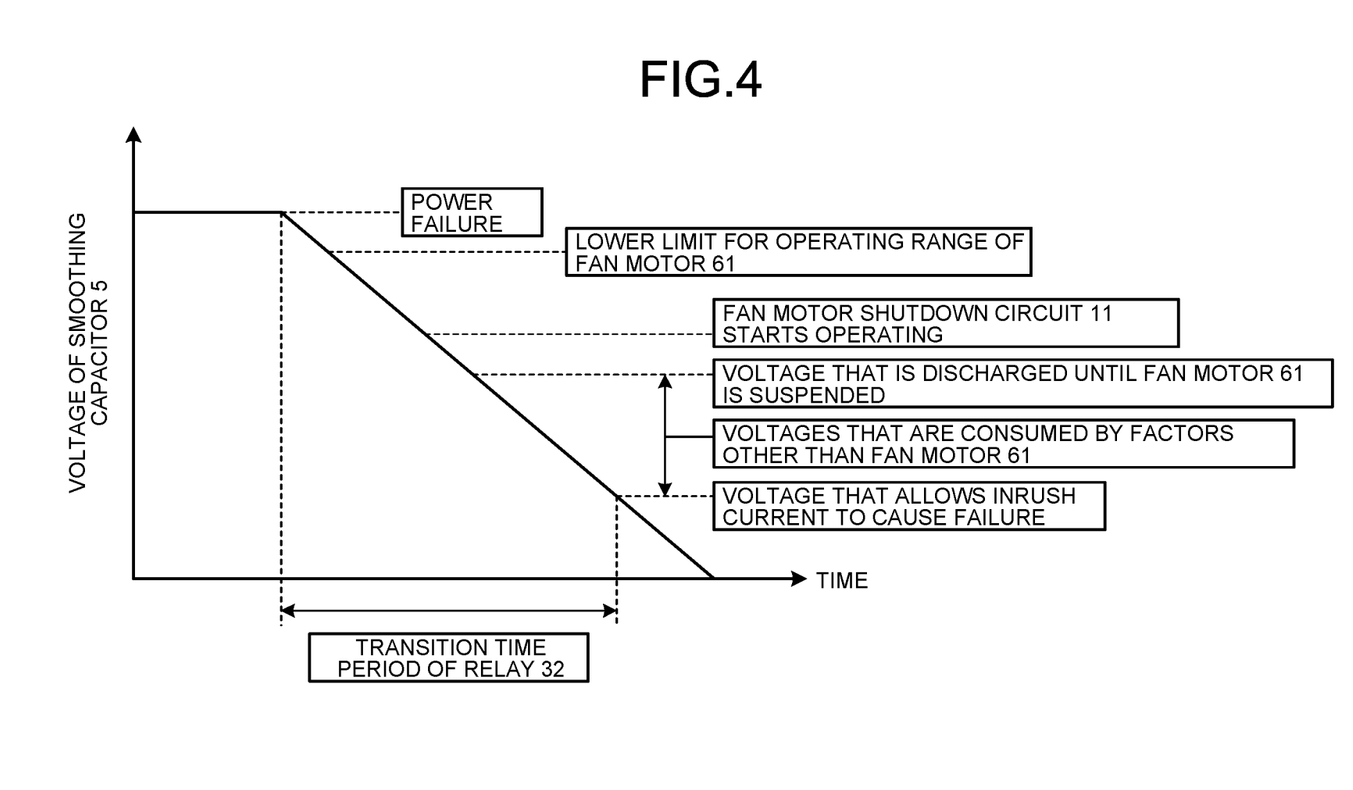
FIG. 4 is used for explaining a threshold pertinent to the operation of the fan motor shutdown circuit in the fan motor stopping apparatus according to the first embodiment.

FIG. 4 is used for explaining the threshold pertinent to the operation of the fan motor shutdown circuit 11 in the fan motor stopping apparatus 1 according to the first embodiment. The threshold is higher than the voltage across the smoothing capacitor 5 (illustrated in FIG. 4) that allows the inrush current to cause the failure of the at least one of the constituent elements of the fan motor stopping apparatus 1 when the power returns after the power failure. Moreover, the threshold is a value allowing for voltages that are consumed by factors other than the fan motor 61, a voltage that is discharged until the fan motor 61 is suspended, and a voltage value that is a lower limit for an operating range of the fan motor 61. FIG. 4 also illustrates a start timing for the operation of the fan motor shutdown circuit 11. FIG. 4 also illustrates a transition time period of the relay 32 of the inrush current protection circuit 3, that is to say, a time period that lasts until the relay 32 shifts to the open state from the closed state.

After the power return, the fan motor shutdown circuit 11 stops operating. The speed control circuit 9 applies the voltage to the fan motor 61 for rotating the fan motor 61 at the specified rotational speed. Accordingly, the fan motor 61 rotates at the specified rotational speed.

Figure 5:
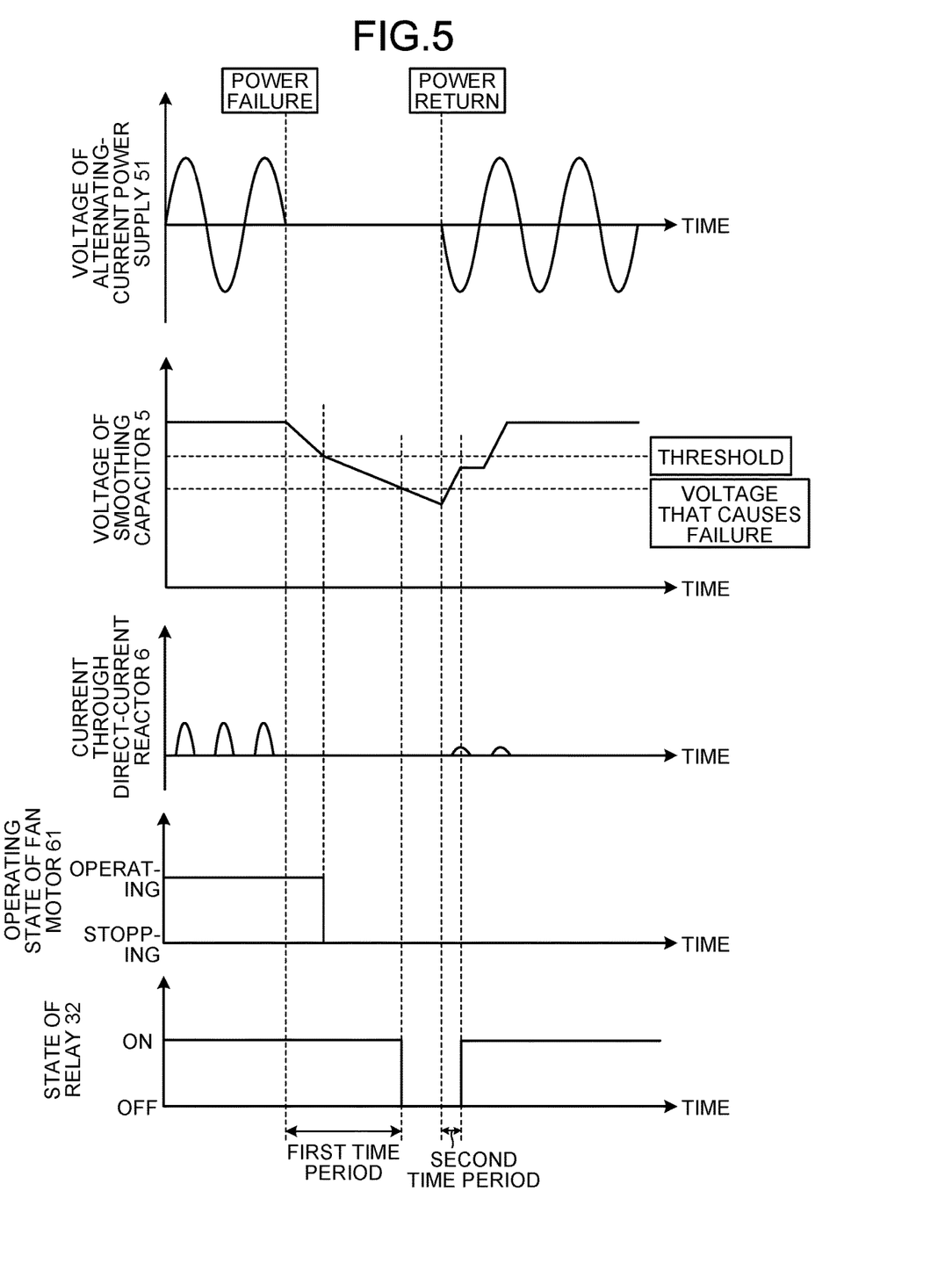
FIG. 5 illustrates waveforms relevant to the fan motor stopping apparatus according to the first embodiment when a power failure lasts longer than a first predetermined time period.

FIG. 5 illustrates waveforms relevant to the fan motor stopping apparatus 1 according to the first embodiment when a power failure lasts longer than the first predetermined time period. Specifically, FIG. 5 illustrates in the form of the waveforms how the voltage of the alternating-current power supply 51, the voltage of the smoothing capacitor 5, the current through the direct-current reactor 6, the operating state of the fan motor 61, and the state of the relay 32 change with time when the power failure lasts longer than the first predetermined time period. In FIG. 5, "ON" indicates that the relay 32 is closed, and "OFF" indicates that the relay 32 is open.

As described above, when the power failure occurs, suspending the power supply from the alternating-current power supply 51 to the conversion circuit 2, the voltage of the smoothing capacitor 5 decreases. The fan motor shutdown circuit 11 suspends the fan motor 61 in operation when the voltage detection circuit 7 detects a voltage of the smoothing capacitor 5 that is less than or equal to the threshold. In this way, the fan motor shutdown circuit 11 effects a reduced amount of discharge from the smoothing capacitor 5 for a power return. Although not illustrated in FIG. 1, a control microcomputer and a relay are included in the air conditioner, which includes the fan motor 61. The relay that is included in the air conditioner is, for example, a relay that operates a four-way valve. As the control microcomputer and the relay consume power, the voltage of the smoothing capacitor 5 decreases.

When the power failure lasts longer than the first predetermined time period, the control microcomputer and the relay in the air conditioner consume the power and thus decrease the voltage of the smoothing capacitor 5 to the voltage level that causes the at least one of the constituent elements of the fan motor stopping apparatus 1 to fail by the time the power returns. If the power returns in this state, resuming the power supply from the alternating-current power supply 51 to the conversion circuit 2, there is an increased possibility of the failure of the at least one of constituent elements in the fan motor stopping apparatus 1.

In addition, there is an increased possibility of the failure of the at least one of the constituent elements in the air conditioner.

As described above, the determination circuit 12 determines whether or not the alternating-current voltage is being supplied from the alternating-current power supply 51 to the conversion circuit 2. In other words, the determination circuit 12 detects the power failure. After the first predetermined time period elapses since the determination circuit 12 first determines the power failure, the relay control circuit 4 opens the relay 32 of the inrush current protection circuit 3. In other words, the relay control circuit 4 opens the relay 32 of the inrush current protection circuit 3 after the first predetermined time period elapses since the power failure.

After the second predetermined time period elapses since the determination circuit 12 first determines the supply of the alternating-current voltage from the alternating-current power supply 51 to the conversion circuit 2 with the relay 32 in the open state, the relay control circuit 4 closes the relay 32. In other words, the relay control circuit 4 closes the relay 32 after the second predetermined time period elapses since the power return. The closure of the relay 32 after the power return prevents the voltage of the smoothing capacitor 5 from decreasing to the voltage level that causes the failure of the at least one of the constituent elements in the air conditioner.

As described above, the fan motor stopping apparatus 1 according to the first embodiment suspends the operation of the fan motor 61 when the voltage detection circuit 7 detects the voltage of the smoothing capacitor 5 that is less than or equal to the threshold. With the suspension of the operation of the fan motor 61, which consumes the relatively great power, the discharge of the smoothing capacitor 5 is reduced by the time the power returns after the power failure.

Therefore, the fan motor stopping apparatus 1 is capable of preventing the failure of the conversion circuit 2 and the part or all of those between the conversion circuit 2 and the fan motor 61 among the constituent elements of the fan motor stopping apparatus 1 when the power returns after the power failure. Moreover, the fan motor stopping apparatus 1 is capable of preventing the failure of the constituent element(s) of an air conditioner when the power returns after the power failure.

The fan motor stopping apparatus 1 opens the relay 32 of the inrush current protection circuit 3 after the first predetermined time period elapses since the power failure occurs with the relay 32 in the closed state. In this way, the fan motor stopping apparatus 1 is capable of preventing the failure of the at least one of the constituent elements in the fan motor stopping apparatus 1 when the power returns. In other words, the fan motor stopping apparatus 1 is capable of preventing the failure of the at least one of the constituent elements in the air conditioner when the power returns.

Moreover, the fan motor stopping apparatus 1 closes the relay 32 after the second predetermined time period elapses since the power returns with the relay 32 in the open state. In this way, the fan motor stopping apparatus 1 is capable of preventing the failure of the at least one of the constituent elements in the fan motor stopping apparatus 1 when the power returns. In other words, the fan motor stopping apparatus 1 is capable of preventing the failure of the at least one of the constituent elements in the air conditioner when the power returns.

Second Embodiment

Figure 6:
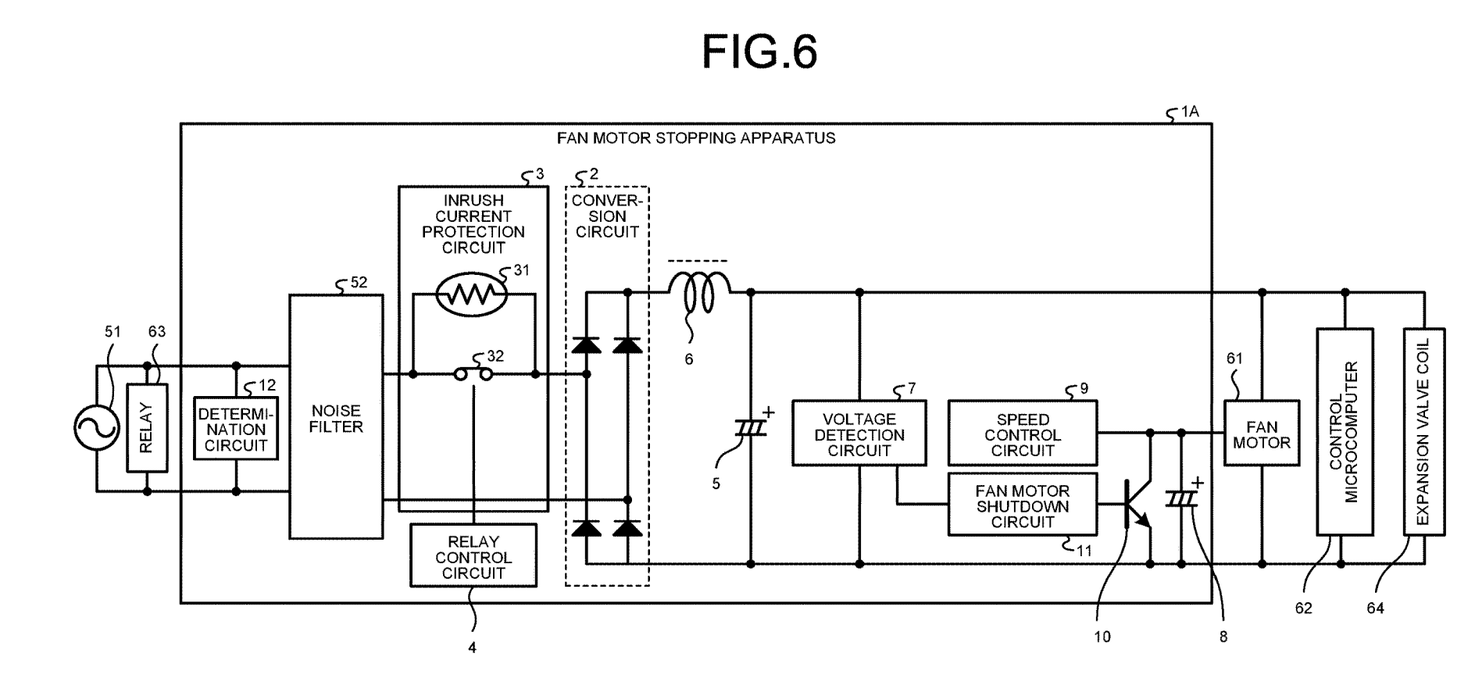
FIG. 6 illustrates a configuration of a fan motor stopping apparatus according to a second embodiment.

FIG. 6 illustrates a configuration of a fan motor stopping apparatus 1A according to the second embodiment. The fan motor stopping apparatus 1A includes all the constituent elements that the fan motor stopping apparatus 1 according to the first embodiment has. The fan motor shutdown circuit 11 according to the second embodiment includes the function that the fan motor shutdown circuit 11 according to the first embodiment has and a function of suspending respective operations of a control microcomputer 62, a relay 63, and an expansion valve coil 64 that are included in an air conditioner. FIG. 6 also illustrates the control microcomputer 62, the relay 63, and the expansion valve coil 64. In the second embodiment, a description is provided mainly of difference from the first embodiment.

The relay 63 is, for example, a relay that operates a four-way valve included in the air conditioner. The expansion valve coil 64 is a coil that operates an expansion valve included in the air conditioner. The control microcomputer 62, the relay 63, and the expansion valve coil 64 consume relatively great power. For example, the relay 63 is a constituent element that is controlled by passage of current through a coil that is not illustrated and thus consumes relatively great power. Therefore, the operations of the control microcomputer 62, the relay 63, and the expansion valve coil 64 have a relatively great effect on the discharge of the smoothing capacitor 5.

When a voltage detected by the voltage detection circuit 7 is less than or equal to the threshold, the fan motor shutdown circuit 11 according to the second embodiment suspends the fan motor 61 in operation and also suspends the operations of the control microcomputer 62, the relay 63, and the expansion valve coil 64 of the air conditioner. In this way, the fan motor stopping apparatus 1A is capable of preventing the constituent elements of the fan motor stopping apparatus 1A from failing when power returns after a power failure. Moreover, the fan motor stopping apparatus 1A is capable of preventing the constituent element(s) of the air conditioner from failing when the power returns after the power failure.

When the voltage detected by the voltage detection circuit 7 is less than or equal to the threshold, the fan motor shutdown circuit 11 may suspend the operation of the fan motor 61 and part of the operations of the control microcomputer 62, the relay 63, and the expansion valve coil 64.

Figure 7:
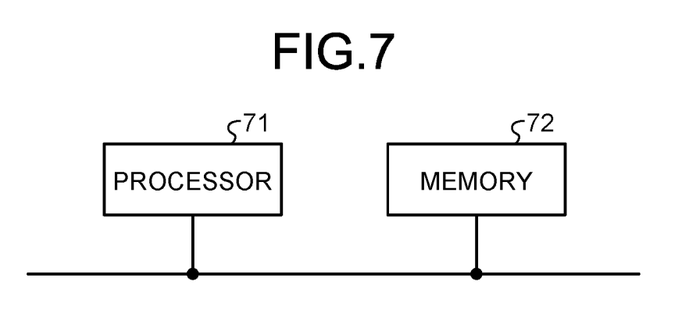
FIG. 7 illustrates a processor with which functions of a relay control circuit, a voltage detection circuit, a speed control circuit, a fan motor shutdown circuit, and a determination circuit of the fan motor stopping apparatus according to the second embodiment are partly implemented.

FIG. 7 illustrates a processor 71 with which the functions of the relay control circuit 4, the voltage detection circuit 7, the speed control circuit 9, the fan motor shutdown circuit 11, and the determination circuit 12 of the fan motor stopping apparatus 1A according to the second embodiment are partly implemented. The functions of the relay control circuit 4, the voltage detection circuit 7, the speed control circuit 9, the fan motor shutdown circuit 11, and the determination circuit 12 may partly be implemented with the processor 71, which executes programs stored in a memory 72. The processor 71 is a central processing unit (CPU), a processing unit, an arithmetic unit, a microprocessor, or a digital signal processor (DSP). FIG. 7 also illustrates the memory 72.

When the processor 71 is used to implement the part of the functions of the relay control circuit 4, the voltage detection circuit 7, the speed control circuit 9, the fan motor shutdown circuit 11, and the determination circuit 12, that part of the functions is implemented by the processor 71 and software, firmware, or a combination of software and firmware. The software or the firmware is described as the programs and is stored in the memory 72. The processor 71 reads and executes the programs stored in the memory 72 to implement the part of the functions of the relay control circuit 4, the voltage detection circuit 7, the speed control circuit 9, the fan motor shutdown circuit 11, and the determination circuit 12.

When the processor 71 is used to implement the part of the functions of the relay control circuit 4, the voltage detection circuit 7, the speed control circuit 9, the fan motor shutdown circuit 11, and the determination circuit 12, the fan motor stopping apparatus 1A includes the memory 72 that stores the programs, which eventually cause steps to be executed by part of those including the relay control circuit 4, the voltage detection circuit 7, the speed control circuit 9, the fan motor shutdown circuit 11, and the determination circuit 12. The programs stored in the memory 72 can be said to cause a computer to perform procedures or methods of the part of those including the relay control circuit 4, the voltage detection circuit 7, the speed control circuit 9, the fan motor shutdown circuit 11, and the determination circuit 12.

The memory 72 refers to, for example, a nonvolatile or volatile semiconductor memory such as a random-access memory (RAM), a read-only memory (ROM), a flash memory, an erasable programmable read-only memory (EPROM), or an electrically erasable programmable read-only memory (EEPROM) (registered trademark), a magnetic disk, a flexible disk, an optical disk, a compact disk, a mini disk, or a digital versatile disk (DVD).

Figure 8:
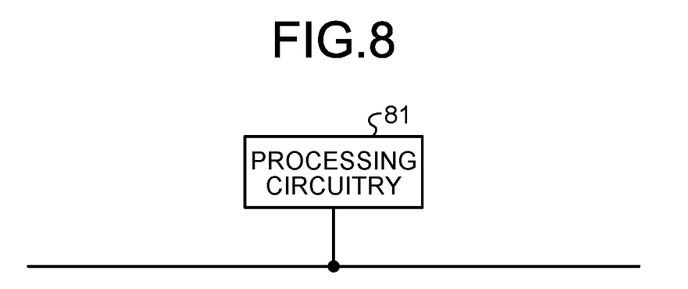
FIG. 8 illustrates processing circuitry with which the relay control circuit, the voltage detection circuit, the speed control circuit, the fan motor shutdown circuit, and the determination circuit of the fan motor stopping apparatus according to the second embodiment are partly or all implemented.

FIG. 8 illustrates processing circuitry 81 with which the relay control circuit 4, the voltage detection circuit 7, the speed control circuit 9, the fan motor shutdown circuit 11, and the determination circuit 12 of the fan motor stopping apparatus 1A according to the second embodiment are partly or all implemented. The processing circuitry 81 may be used to implement the part or all of those including the relay control circuit 4, the voltage detection circuit 7, the speed control circuit 9, the fan motor shutdown circuit 11, and the determination circuit 12.

The processing circuitry 81 is dedicated hardware. The processing circuitry 81 refers to, for example, a single circuit, a composite circuit, a programmed processor, a parallel programmed processor, an application-specific integrated circuit (ASIC), a field-programmable gate array (FPGA), or a combination of these.

The relay control circuit 4, the voltage detection circuit 7, the speed control circuit 9, the fan motor shutdown circuit 11, and the determination circuit 12 may partly be dedicated hardware that is separate from a remaining part.

The functions of the relay control circuit 4, the voltage detection circuit 7, the speed control circuit 9, the fan motor shutdown circuit 11, and the determination circuit 12 may partly be implemented by software or firmware, and a remaining part of those functions may be implemented by dedicated hardware. As described above, the functions of the relay control circuit 4, the voltage detection circuit 7, the speed control circuit 9, the fan motor shutdown circuit 11, and the determination circuit 12 are implementable by the hardware, the software, the firmware, or the combination of these.

The above configurations illustrated in the embodiments are illustrative of contents of the present invention, can be combined with other techniques that are publicly known and can be partly omitted or changed without departing from the gist of the present invention.

The invention claimed is:

1. A fan motor stopping apparatus comprising:
a conversion circuit configured to convert alternating-current voltage supplied from an alternating-current power supply into direct-current voltage;
a smoothing capacitor configured to smooth the direct-current voltage from the conversion circuit, the smoothing capacitor being connected to a fan motor included in an air conditioner;
a voltage detection circuit configured to detect a voltage across the smoothing capacitor;
a fan motor shutdown circuit configured to suspend the fan motor in operation when the voltage detection circuit detects the voltage across the smoothing capacitor to be less than or equal to a threshold that is preset for suspending the operation of the fan motor;
an inrush current protection circuit configured to prevent an inrush current from flowing into the conversion circuit, the inrush current protection circuit including a resistor connected to the alternating-current power supply and the conversion circuit and a relay in parallel with the resistor to switch between a state of connecting the alternating-current power supply and the conversion circuit and a state of disconnecting the alternating-current power supply and the conversion circuit;
a relay control circuit configured to control the relay of the inrush current protection circuit; and
a determination circuit configured to determine whether the alternating-current voltage is being supplied from the alternating-current power supply to the conversion circuit or whether, as a result of a power failure, there is a suspension of the alternating-current voltage being supplied from the alternating-current power supply to the conversion circuit, wherein
when a first predetermined time period elapses after the determination circuit first determines the suspension of the alternating-current voltage being supplied from the alternating-current power supply to the conversion circuit, with the relay in a closed state, the relay control circuit opens the relay,
the threshold that is preset for suspending the operation of the fan motor is higher than a voltage across the smoothing capacitor that allows an inrush current to cause failure of at least one constituent element of the fan motor stopping apparatus when power returns after the power failure,
the first predetermined time period is a time period between a first point of time when the determination circuit first determines the suspension of the alternating-current voltage being supplied from the alternating-current power supply to the conversion circuit and a second point of time when the smoothing capacitor experiencing a decrease in voltage reaches a voltage level that causes electronic component failure when the power returns, and
when the voltage across the smoothing capacitor detected by the voltage detection circuit is less than or equal to the threshold, operation in the air conditioner of a control microcomputer, an expansion valve coil, and a second relay are partly or all suspended by the fan motor shutdown circuit.

2. The fan motor stopping apparatus according to claim 1, wherein
the relay control circuit closes the relay after a second predetermined time period elapses after the determination circuit secondly determines the alternating-current voltage is supplied from the alternating-current power supply to the conversion circuit with the relay in an open state.

* * * * *